United States Patent [19]
Kinder

[11] Patent Number: 5,842,347
[45] Date of Patent: Dec. 1, 1998

[54] METHOD AND APPARATUS FOR MONITORING THE LEVEL OF LIQUID NITROGEN IN A CRYOGENIC STORAGE TANK

[75] Inventor: Kent Kinder, Jacksboro, Tex.

[73] Assignee: Sengentrix, Inc., Jacksboro, Tex.

[21] Appl. No.: 939,294

[22] Filed: Sep. 29, 1997

Related U.S. Application Data

[60] Provisional application No. 60/029,619 Oct. 25, 1996.
[51] Int. Cl.$^6$ ....................................................... F17C 13/02
[52] U.S. Cl. ............................... 62/49.2; 73/295; 137/392
[58] Field of Search ................................ 62/49.2; 73/295; 137/392

[56] References Cited

U.S. PATENT DOCUMENTS 5,393,736  2/1995  Hodge et al. ............................. 73/295
5,417,072  5/1995  Silver et al. ............................. 62/51.1
5,488,831  2/1996  Griswold ................................. 62/50.2
5,616,838  4/1997  Preston et al. .......................... 62/50.1
5,671,603  9/1997  McCorkle et al. ....................... 62/49.2

Primary Examiner—Ronald C. Capossela
Attorney, Agent, or Firm—Melvin A. Hunn

[57] ABSTRACT

A monitoring apparatus is provided for use in cryogenic storage tanks. The monitoring apparatus is a combination cap and monitoring system. The monitoring system includes a sensor which is submerged in liquid nitrogen, a circuit for detecting changes in resistance of the sensor should the liquid nitrogen level fall to or below a selected level, and an audio output device which generates an audible alarm if the liquid nitrogen falls to or below the selected level.

15 Claims, 3 Drawing Sheets

METHOD AND APPARATUS FOR
MONITORING THE LEVEL OF LIQUID
NITROGEN IN A CRYOGENIC STORAGE
TANK

BACKGROUND OF THE INVENTION

This application claims the benefit of U.S. Provisional application Ser. No. 60/029,619 filed Oct. 25, 1996.

1. Field of the Invention

The present invention relates in general to monitoring systems for cryogenic storage devices, and in particular to monitoring systems for monitoring the level of liquid nitrogen in a cryogenic storage tank.

2. Description of the Prior Art

Over the last two decades animal breeders have become increasingly reliant on artificial insemination as a means for impregnating animals and ensuring that livestock have certain genetic attributes which are desired for a particular application. Typically, a cryogenic storage device is utilized to maintain an inventory of animal semen in a frozen state, thus preserving and prolonging the useful life of the semen. It is not uncommon for an inventory of animal semen to comprise a very valuable inventory. Of course, the inventory is subject to complete loss in the event that the cryogenic storage device fails. One common type of failure is a gradual diminution in the amount of the liquid nitrogen present within the cryogenic device. The current state of the art is defective in that it does not provide systems which monitor and alert an operator in the event of a diminution in the amount of liquid nitrogen within a cryogenic storage device. The present invention is directed at overcoming these shortcomings in the prior art.

SUMMARY OF THE INVENTION

It is one objective of the present invention to provide a monitoring system for a cryogenic storage tank which continuously monitors the level of the liquid nitrogen within the cryogenic storage tank.

It is another objective of the invention to provide a liquid nitrogen monitoring system which includes an audible alarm which is activated when a diminution in the liquid nitrogen level is detected.

It is yet another objective of the present invention to provide such a liquid nitrogen monitoring system for a cryogenic storage tank in which all of the monitoring system components are integrally formed within the cryogenic storage tank stopper. Preferably, but not necessarily, a thermistor sensor is housed within a tip on a probe which extends into the cryogenic storage tank from the tank cap. When the thermistor sensor is immersed in liquid nitrogen, the heat generated through its internal resistance is absorbed by the liquid nitrogen; however, when the thermistor sensor is no longer immersed in the liquid nitrogen (due to diminution in the amount of liquid nitrogen in the cryogenic storage tank) the heat generated through its internal resistance is no longer absorbed by the liquid nitrogen, thereby causing a large change in the internal resistance of the thermistor. An electronic circuit which is carried by the cap detects the change in internal resistance and activates an audible alarm. The alarm serves to alert an operator about the dangerous diminution in the amount of liquid nitrogen within the cryogenic storage tank.

Additional objective, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
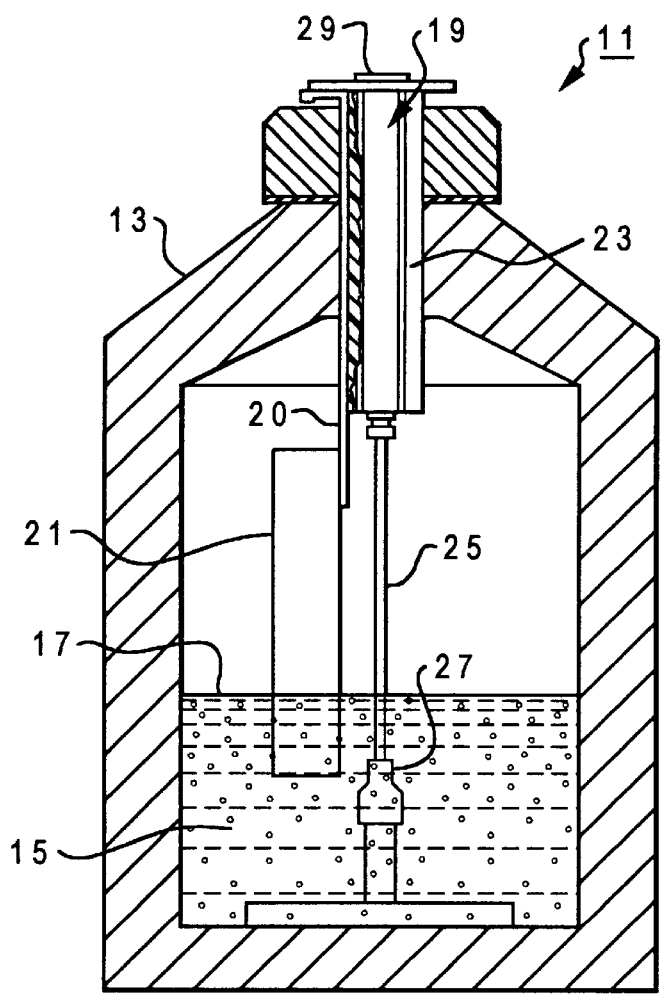
FIG. 1 is a pictorial representation of a cryogenic storage tank equipped with the liquid nitrogen monitoring system of the present invention, in longitudinal section view.

FIG. 1 is a pictorial representation of a cryogenic storage tank 11 equipped with a monitoring system in accordance with the present invention. As is shown, cryogenic storage tank 11 includes a liquid nitrogen refrigerator 13 which is at least partially filled with liquid nitrogen 15 up to a predetermined nitrogen level 17. Cryogenic storage tank 11 includes an opening at its upper end which is occluded during use by stopper 23 of the combination cap and monitoring system 19 of the present invention. A sensor probe 25 extends downward from stopper 23 and suspends a sensor 27 within liquid nitrogen 15. Animal semen is stored within a number of semen racks, such as semen rack 21, which are suspended by stems such as stem 20. In ordinary use, a predetermined number of conventional semen racks 21 are suspended within liquid nitrogen 15. In the preferred embodiment of the a present invention, the cryogenic storage tank 11 is capable of accommodating up to six semen racks 21. In order to more clearly illustrate the invention, and for purposes of clarity, only a single semen rack 21 is depicted in FIG. 1. In accordance with the present invention an electrical circuit (see FIG. 9) continuously provides current to sensor 27, which preferably includes a thermistor. If sensor 27 is fully emerged within liquid nitrogen 15, the liquid nitrogen will dissipate the heat generated by current passing through the thermistor. As long as this condition is maintained, no alarm will be sounded. However, once liquid nitrogen 15 dissipates and the liquid nitrogen level 17 falls to or below a selected unacceptable level, the liquid nitrogen 15 no longer absorbs the heat generated by current passing through the thermistor, and a resistance change in the thermistor is detectable. This resistance change is utilized to trigger an audible alarm which is sounded by alarm 29.

The present invention is similar to a smoke detector in that it is battery-operated, and does not require an electrical connection to an interruptable power source. As long as the batteries are replaced in accordance with a maintenance schedule, a current sufficient for monitoring purposes will be available for flow through the thermistor.

Figure 2:
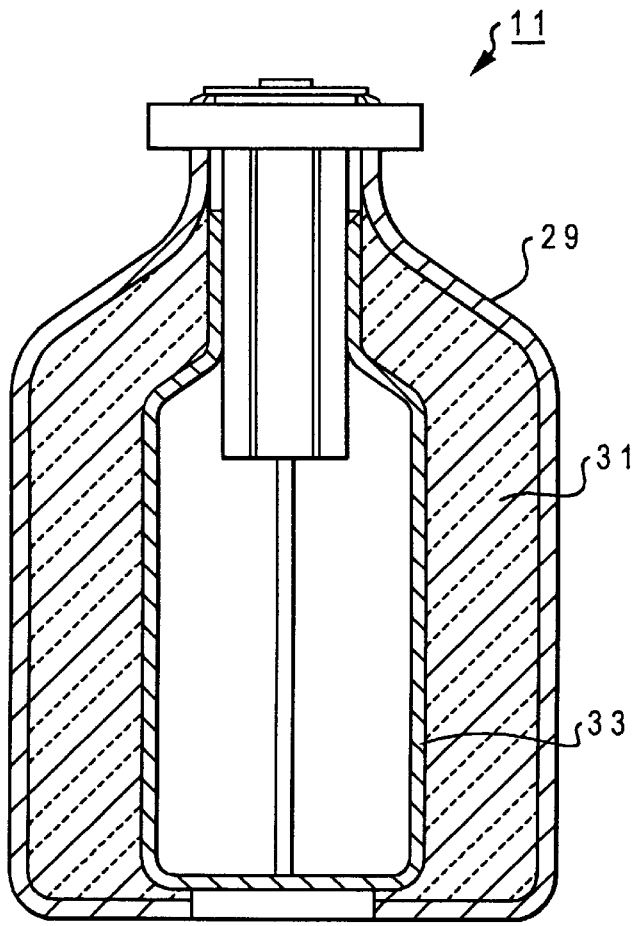
FIG. 2 is a pictorial representation of a prior art cryogenic storage tank, which depicts the operating components of a prior art cryogenic storage tank.

FIG. 2 is a simplified cross-section view of a prior art cryogenic storage tank in order to allow the depiction and description of its components. As is shown in FIG. 2, the cryogenic storage tank 11 includes an inner canister 33 and an outer canister 29. An insulating material 31 is provided between the inner and outer canisters 33, 29. Preferably, the inner and outer canisters 33, 29 and insulation 31 constitute a vacuum-bottle construction which is highly efficient in insulating the interior portion of the inner canister 33 from the ambient environment.

Figure 3:
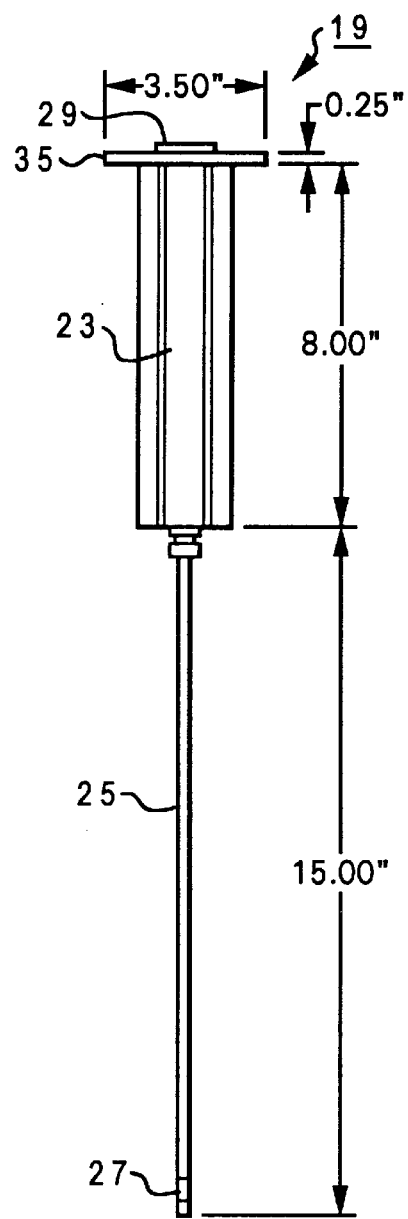
FIG. 3 is a pictorial representation of the probe, stopper, and cap of the present invention.

FIG. 3 is a pictorial representation of the preferred embodiment of the cap and monitoring system 19 of the present invention. In this particular view, some dimensions are provided in order to illustrate the relative size of the components. As is shown, sensor 27, preferably a thermistor, is carried at the lower most end of sensor probe 25. Sensor probe 25 extends downward from stopper 23. Stopper 23 terminates at its upper portion at a cap 35. A conventional electronic alarm 29 is carried by cap 35.

Figure 4:
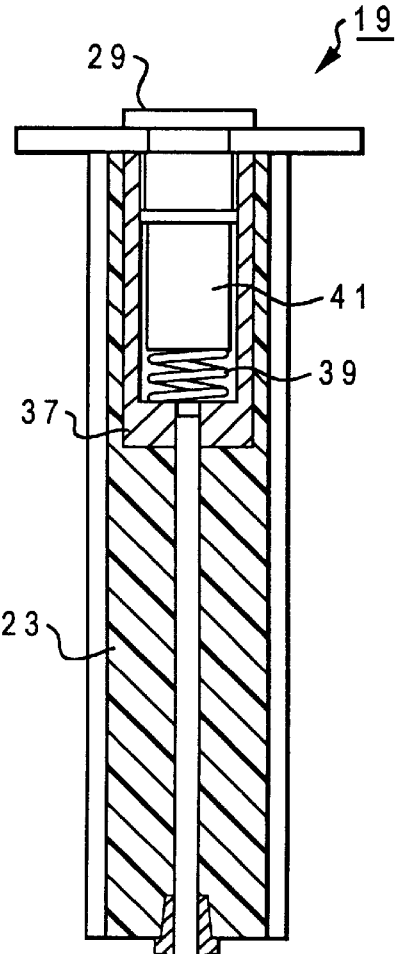
FIG. 4 is a longitudinal section view of the probe, stopper, and cap of FIG. 3 in accordance of the present invention.
Figure 4:
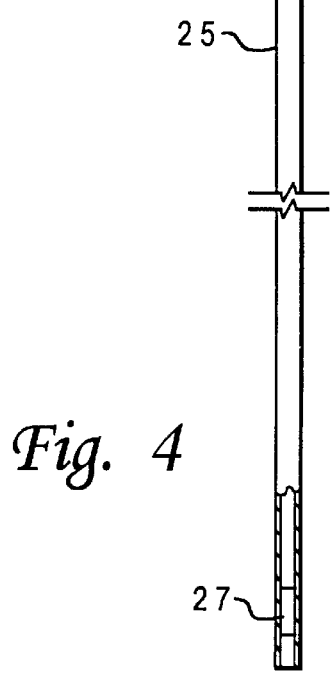

FIG. 4 is a simplified cross-section view of the cap and monitoring system 19 of the present invention. As is shown, sensor 27, a thermistor, is carried within a cavity at the lower most portion of sensor probe 25. Furthermore, a cavity 36 is defined within stopper 23. Cavity 36 accommodates battery 41 (see FIG. 9), an electrical circuit (see FIG. 9), and an audio output device 29 (see FIG. 9) that functions as an alarm. Preferably, battery 41 is biased by spring 39 to engage the circuit, as is conventional in many battery-powered devices.

Figure 5:
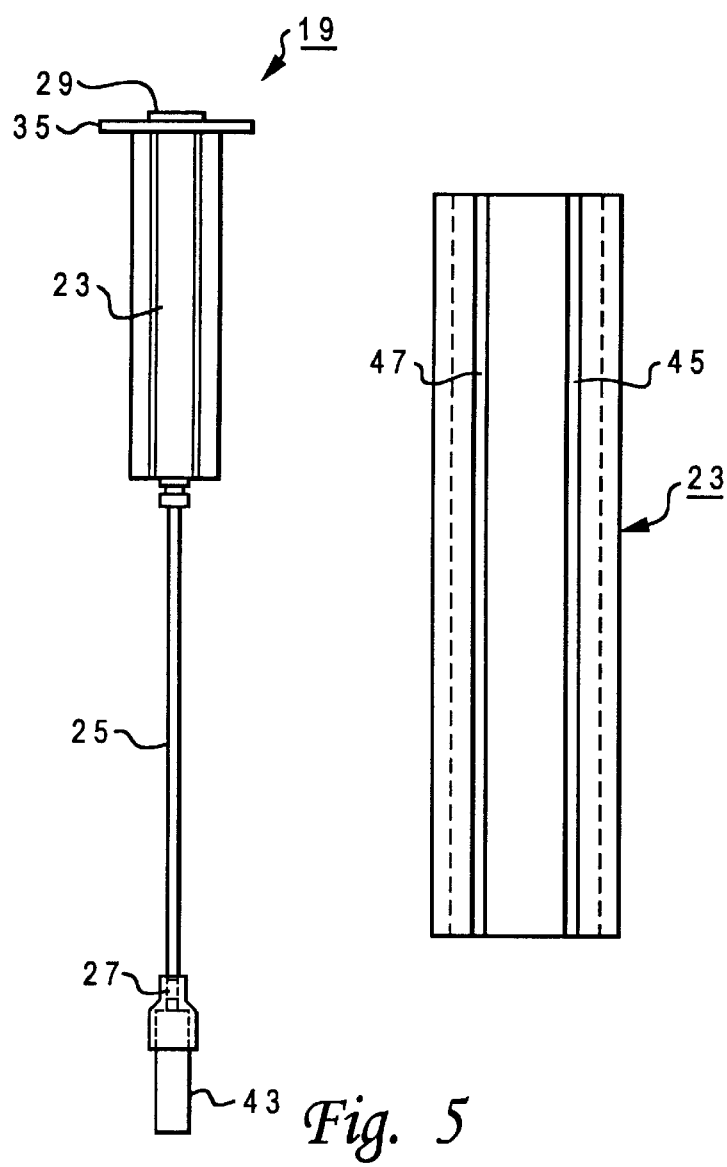
FIG. 5 is a pictorial representation of alternative embodiment of a probe, stopper, and cap in accordance with the present invention.

FIG. 5 is a pictorial representation of an alternative embodiment of the cap and monitoring system 19 of the present invention. As is shown, sensor 27 is carried at the lower most portion of sensor probe 25 and is protected from damage by a sensor guard 43 which houses sensor 27. As is shown in the previous embodiment, sensor probe 25 extends downward from stopper 23 which is dimensioned to allow full occlusion of the opening in the cryogenic storage tank (11 of FIG. 1).

Figure 6:
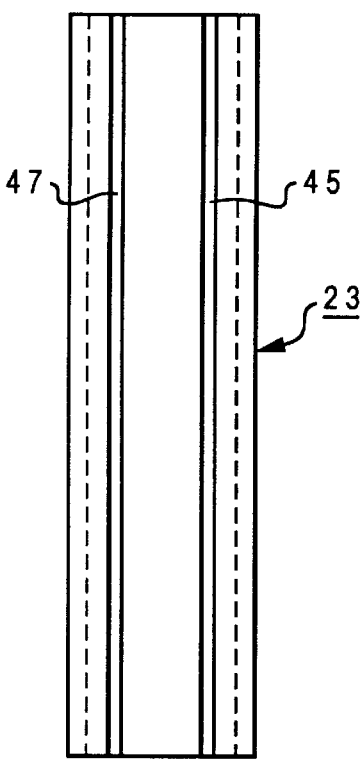
FIGS. 6 and 7 are pictorial and cross-section representations of the stopper utilized in the present invention.
Figure 7:
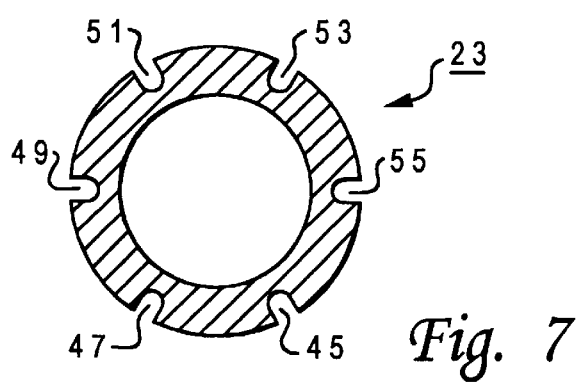

FIGS. 6 and 7 depict aspects of stopper 23 which have not yet been discussed. FIG. 6 is a pictorial representation of stopper 23. As is shown, channels 45, 47 are formed in the exterior surface of stopper 23. These channels are sized and shaped in order to accommodate stems 20 (see FIG. 1) which suspend semen racks 21 (see FIG. 1) into cryogenic storage tank 11 (see FIG. 1). FIG. 7 is a cross-section view of stopper 23 (see FIG. 6). As is shown, channels 45, 47, 49, 51, 53, and 55 are placed about the exterior surface of stopper 23, with each channel 45, 47, 49, 51, 53, and 55 being equidistance from the adjoining channels. Each channel 45, 47, 49, 51, 53, and 55 is adapted to accommodate stems 20 (see FIG. 1) which suspend semen racks 21 (see FIG. 1) into liquid nitrogen 15 (see FIG. 1) in cryogenic storage tank 11 (see FIG. 1).

Figure 8:
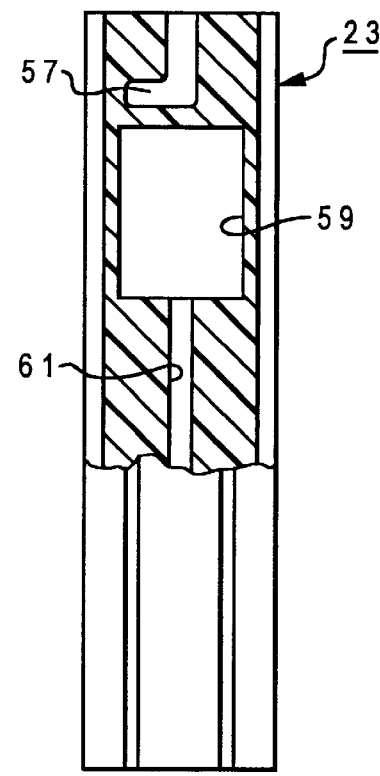
FIG. 8 is a longitudinal section view of a stopper in accordance with the present invention.

FIG. 8 is a pictorial representation of stopper 23 in cross-section. As is shown, a relatively narrow cavity 61 is formed along the central axis of stopper 23 in order to accommodate sensor probe 25 (see FIG. 1) and sensor 25 (see FIG. 1). At its upper-most portion, stopper 23 includes a relatively larger diameter cavity 59 which is adapted to accommodate spring 39 (see FIG. 4), battery 41 (see FIG. 4), alarm 29 (see FIG. 4), and electronic circuity (see FIG. 9) of the combination cap and monitoring system 19 (see FIG. 1). As is shown in FIG. 8, an additional cavity 57 may be formed in order to house the electronic circuitry (see FIG. 9).

Figure 9:
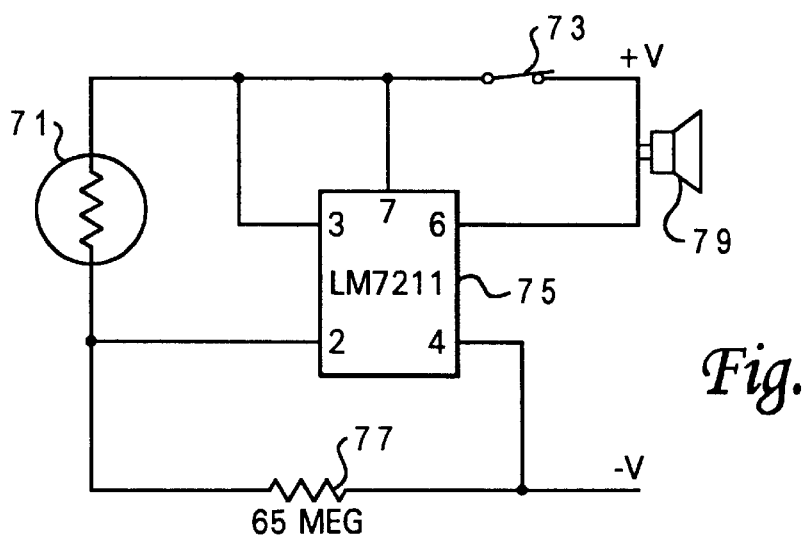
FIG. 9 is a circuit drawing of the present invention.

FIG. 9, is a circuit depiction of the circuit utilized for monitoring the liquid nitrogen level. In the preferred embodiment of the present invention, an operational amplifier 75, preferably an LM7211 operational amplifier, is electrically connected to a thermistor 71, a switch 73, an audio output device 79, and a resistor 77. Voltage from a battery (not shown but represented as V+ and V−) is supplied to the circuit in order to cause current to flow through switch 73, thermistor 71, and resistor 77. When thermistor 71 is fully immersed in liquid nitrogen 15 (see FIG. 1), it maintains a constant resistance. The voltage drop across thermistor 71 is monitored by operational amplifier 75 through input pins 2, 3. Resistor 77 limits the current flow through thermistor 71 and establishes a reference voltage which is monitored by operational amplifier 75 at pins 2, 4. If the level of liquid nitrogen 15 (see FIG. 1) within cryogenic storage tank 11 (see FIG. 1) drops to or below a selected unacceptable level, thermistor 71 is no longer fully submerged in liquid nitrogen 15, and it undergoes a change in resistance due to the heat generated by current passing through thermistor 71. In the preferred embodiment of the current invention, operational amplifier 75 and resistor 77 are selected in order to ensure that resistance changes of approximately 5,000 ohms are sufficient to trigger operational amplifier 75 to allow current flow through audio output device 75, thereby sounding an audible alarm which warns the operator that semen specimens (not shown) on semen racks 21 (see FIG. 1) within cryogenic storage tank 11 (see FIG. 1) may be in jeopardy due to elevated temperatures.

Referring now to all the figures, an operator accomplishes the method of the present invention by inserting stems 20 of semen racks 21 into channels 45, 47, 49, 51, 53, and 55 of stopper 23. Stopper 23 is inserted into the opening in cryogenic storage tank 11, such that sensor probe 25 extends downward into cryogenic storage tank 11 from stopper 23. Stopper 23 is inserted such that it occludes the opening. The electrically actuatable sensor is submersed below nitrogen level 17. Sensor 27, being carried by sensor probe 25, is adapted for submersion below nitrogen level 17. Sensor 27 provides a first monitoring response when fully submerged below nitrogen level 17, and a second monitoring response when not fully submerged below nitrogen level 17. The operator monitors first monitoring response of sensor 27 and second monitoring response of sensor 27 with electrical monitoring circuit. Audio output device 79 is coupled to electrical monitoring circuit. An audible output alarm is produced by audio output device 79 when sensor 27 is not fully submerged below nitrogen level 17. In response to audible output alarm, the operator performs necessary procedures to replenish liquid nitrogen 15, such that nitrogen level 17 is maintained.

While the invention has been shown in only one of its forms, it is not thus limited but is susceptible to various changes and modifications without departing from the spirit thereof.

what is claimed is:

1. a cryogenic storage system, comprising:
   (a) an insulated cryogenic storage tank having an access port formed therein;
   (b) liquid nitrogen carried within the cryogenic storage tank;
   (c) a combination cap and monitoring system, including:
   (1) a stopper adapted in size for the occlusion of the access port within the cryogenic storage tank;
   (2) a sensor probe extending downward into said cryogenic storage tank from said stopper;
   (3) an electrically actuatable sensor carried by said sensor probe and adapted for submersion in said liquid nitrogen;

(4) wherein said electrically actuatable sensor provides one monitoring response when fully submerged in said liquid nitrogen, and a second monitoring response when not fully submerged within said liquid nitrogen;

(5) an electrical monitoring circuit for monitoring said first monitoring response of said sensor, and for monitoring said second monitoring response of said sensor; and (6) an audio output device coupled to said monitoring circuit, for providing an audio output alarm when said sensor is not fully submerged in said liquid nitrogen.

2. A cryogenic storage system according to claim 1, wherein said electrically actuated sensor comprises a thermistor.

3. A cryogenic storage system according to claim 1, wherein said electrical monitoring circuit comprises a circuit adapted for detecting changes in the resistance in said monitoring system when said liquid nitrogen drops below a selected acceptable level.

4. A cryogenic storage system according to claim 1, further comprising:

(a) a battery for energizing said electrically actuatable sensor and said electrical monitoring circuit.

5. A cryogenic storage system according to claim 1, wherein said electrical monitoring circuit comprises a circuit adapted for detecting the change in resistance of said electrical monitoring sensor.

6. A combination cap and monitoring system for monitoring a level of liquid nitrogen in an insulated, cryogenic storage tank of the type having an access port therein, said combination cap and monitoring system comprising:

(a) a stopper adapted in size for the occlusion of the access port within the cryogenic storage tank;

(b) a sensor probe extending downward into said cryogenic storage tank from said stopper;

(c) an electrically actuatable sensor carried by said sensor probe and adapted for submersion in said liquid nitrogen;

(d) wherein said electrically actuatable sensor provides a first monitoring response when fully submerged within said liquid nitrogen, and a second monitoring response when not fully submerged within said liquid nitrogen;

(e) an electrical monitoring circuit for monitoring said first monitoring response of said sensor, and for monitoring said second monitoring response of said sensor; and (f) an audio output device coupled to said monitoring circuit, for providing an audio output alarm when said sensor is not fully submerge in said liquid nitrogen.

7. A combination cap and monitoring system according to claim 6, wherein the electrically actuatable sensor comprises a thermistor.

8. A combination cap and monitoring system according to claim 6, wherein said electrical monitoring circuit comprises a circuit adapted for detecting changes in the resistance in said monitoring system when said liquid nitrogen drops below a selected acceptable level.

9. A combination cap and monitoring system according to claim 6, further comprising:

(a) a battery for energizing said electrically actuatable sensor and electrical monitoring circuit.

10. A combination cap and monitoring system according to claim 6, wherein said electrical monitoring circuit comprises a circuit adapted for detecting the change in resistance of said electrically actuatable sensor.

11. A method of monitoring a level of liquid nitrogen in an insulated, cryogenic storage tank of the type having an access port therein, said method comprising the steps of:

(a) inserting a stopper into said access port such that a sensor probe extends downward into said cryogenic storage tank from said stopper, said stopper being adapted in size for the occlusion of the access port within the cryogenic storage tank;

(c) submersing an electrically actuatable sensor below said level of liquid nitrogen, said electrically actuatable sensor being carried by said sensor probe and adapted for submersion below said level of liquid nitrogen such that said electrically actuatable sensor provides a first monitoring response when fully submerged below said level of liquid nitrogen, and a second monitoring response when not fully submerged below said level of liquid nitrogen;

(e) monitoring said first monitoring response of said sensor and monitoring said second monitoring response of said sensor with an electrical monitoring circuit; and (f) responding to an audio output alarm when said sensor is not fully submerged below said level of liquid nitrogen, said audio output alarm being provided by an audio output device coupled to said monitoring circuit.

12. A method according to claim 11, wherein the electrically actuatable sensor is a thermistor.

13. A method according to claim 11, wherein said electrical monitoring circuit comprises a circuit adapted for detecting changes in the resistance in said monitoring system when said liquid nitrogen drops below a selected acceptable level.

14. A method according to claim 11, wherein said electrically actuatable sensor and said electrical monitoring circuit are energized by a battery.

15. A method according to claim 11, wherein said electrical monitoring circuit comprises a circuit adapted for detecting the change in resistance of said electrically actuatable sensor.

\* \* \* \* \*